(12) United States Patent
Miwata et al.

(10) Patent No.: US 7,969,094 B2
(45) Date of Patent: Jun. 28, 2011

(54) LIGHT SOURCE APPARATUS

(75) Inventors: Shuhei Miwata, Hyogo (JP); Toshiya Ukai, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 272 days.

(21) Appl. No.: 12/289,935

(22) Filed: Nov. 7, 2008

(65) Prior Publication Data

US 2009/0121602 A1    May 14, 2009

(30) Foreign Application Priority Data

Nov. 9, 2007  (JP) .................................. 2007-291749

(51) Int. Cl.
*H01J 17/44* (2006.01)
(52) U.S. Cl. .................... 313/594; 313/318.01
(58) Field of Classification Search .................. 313/623, 313/627–643, 567, 111–117, 25–27, 318.01–318.09; 439/615, 739; 445/24, 26, 29, 22
See application file for complete search history.

(56) References Cited

U.S. PATENT DOCUMENTS

2004/0095069 A1 * 5/2004 Yamashita et al. ............ 313/594

FOREIGN PATENT DOCUMENTS

JP         2007-66742 A      3/2007

* cited by examiner

*Primary Examiner* — Nimeshkumar D Patel
*Assistant Examiner* — Donald L Raleigh
(74) *Attorney, Agent, or Firm* — Rader, Fishman & Grauer PLLC

(57) ABSTRACT

A light source apparatus, comprises a discharge lamp and an auxiliary start-up light source provided in a base for the discharge lamp, wherein first and second external electrodes of the auxiliary start-up light source are formed on an outer face of a discharge container thereof, wherein a first lamp power feeder connected to a first external lead extending from one of the sealing portions of the discharge lamp and a first auxiliary light source power feeder connected to the first external electrode of the auxiliary start-up light source are connected to the first power supply terminal, and wherein a second lamp power feeder connected to a second external lead extending from the other sealing portion of the discharge lamp and a second auxiliary light source power feeder connected to a second external electrode of the auxiliary start-up light source are connected to the second power supply terminal.

3 Claims, 6 Drawing Sheets

LIGHT SOURCE APPARATUS

CROSS-REFERENCES TO RELATED APPLICATION

The disclosure of Japanese Patent Application No. 2007-291749, filed Nov. 9, 2007 including its specification, claims and drawings, are incorporated herein by reference in its entirety.

TECHNICAL FIELD

Described herein is a light source apparatus, and specifically, relates to a light source apparatus used as a light source of an optical apparatus provided in a projector.

BACKGROUND

In general, a light source apparatus used for an optical apparatus, such as a liquid crystal projector or a DLP projector, is integrally made up of a high intensity discharge lamp, such as a high-pressure mercury discharge lamp, which is a light source, a reflection mirror which condenses light emitted from the high intensity discharge lamp, and reflects it towards a front opening, and an auxiliary start-up light source which decreases starting voltage of the high intensity discharge lamp, and improves the starting nature of the high intensity discharge lamp.

FIG. 6 is an explanatory diagram showing the structure of a light source apparatus according to the prior art. The light source apparatus comprises an extra-high pressure mercury lamp 1 (hereinafter referred to as a discharge lamp), a reflection mirror 2 which surrounds a discharge lamp 1, a base 3 which is fixed to a neck portion 21 of the ellipse reflection mirror 2, a conductive holding member 7 which is fixed to the reflection mirror 2 by a fixed member, an auxiliary start-up light source 4 which is held by the conductive holding member 7 so as to be arranged in the reflection mirror 2.

One of sealing portions of the discharge lamp 1 is inserted in a through hole formed in the neck portion 21 of the reflection mirror 2 so as to be fixed to the base 3 by the adhesive agent. A lamp power feeder 11a is connected to an external lead 11 which extends from one sealing portion of the discharge lamp 1, and the other end of the lamp power feeder 11a is connected to an electric supply terminal 5 which is fixed to the base 3. A lamp power feeder 12a is connected to an external lead 12 which extends from a sealing portion of the other side of the discharge lamp 1. The other end of the lamp power feeder 12a is led out from an opening 22 of the reflection mirror 2 to the outside of the reflection mirror 2, so as to be connected to an electric supply terminal 8 which is fixed to the reflection mirror 2.

FIGS. 7A and 7B are diagrams for explaining the connection structure of the auxiliary start-up source and the reflection mirror. The conductive holding member 7 and the electric supply terminal 8 are attached to the opening 22 of the reflection mirror 2 by the fixed member. That is, the fixed member is made up of a cylindrical grommet member 90 and an inner tooth washer 91. After the cylindrical grommet member 90 is inserted in an opening of the conductive holding member 7, the opening 22 of the reflection mirror 2, an opening of the electric supply terminal 8, and the inner tooth washer 91, these members are integrally fixed by bending the tip of grommet member 90 so that a projected tip may be opened and then processing it. Moreover, the lamp power feeder 12a is inserted in an inner through hole of the grommet member 90, and crimped (or squeezed) with the high-pressure power feeder connected with a power supply at a cylindrical section of the electric supply terminal 8.

Where, in the auxiliary start-up source 4, a pair of external electrodes is provided so as to be apart from each other on the outer surface of the both ends of the electric discharge container. An end portion, which is in a side where one of the external electrodes of the electric discharge container is provided, is inserted in the cylindrical section provided in the conductive holding member 7. The conductive holding member 7 not only holds the auxiliary start-up light source 4 but also functions as an electric path to the one of external electrodes of the auxiliary start-up light source 4. The external electrode of the other side of the auxiliary start-up light source is electrically in a float state. Refer to Japanese Laid Open Patent No. 2007-66742.

SUMMARY

In such a light source apparatus, a dielectric multilayer film is provided on a reflective surface of the reflection mirror 2, in order to reflect a visible light towards a front side thereof. In case the electric supply terminal 8 is fixed to the reflection mirror 2, using the grommet member 90, it is bent and processed so that the tip of the grommet member 90 may be opened. In this case, a portion of the reflection mirror 2, where the grommet member 90 is located, is pinched with a jig and the tip of the grommet member 90 is crimped so as to be opened. And when the tip of the grommet member 90 is squeezed so as to be fixed, the jig may be brought in contact with the dielectric multilayer film near the grommet member 90, so that the dielectric multilayer film is separated therefrom, whereby there is a problem that the reflection ratio of a reflection mirror decreases.

Furthermore, in recent years, much more miniaturization of a projector apparatus is demanded, so that the holding space of such a light source apparatus becomes small, and a distance between a back face of a reflection mirror thereof and a casing which defines the holding space becomes small. However, as shown in FIG. 7B, the electric supply terminal 8 which is attached to the back face of the reflection mirror has a shape in which a portion is projected from the reflection mirror 2 by a height h shown in the figure. That is, since the electric supply terminal 8 becomes closer to the casing by the height of the projected portion, when high voltage is impressed to the electric supply terminal 8 at time of lamp starting, electric discharge may occur between the electric supply terminal 8 and the casing so that there is a possibility that an operator gets an electric shock.

Here, such a problem is solved by providing a high light source apparatus in which damage is not caused to the reflective surface of the reflection mirror, and the reflection ratio thereof does not decrease, and further a sufficient insulation distance between an electric supply terminal and a casing in which a light source apparatus is installed, can be secured so as to be in no danger of an electric shock.

That is, the light source apparatus comprises a discharge lamp in which a pair of electrodes are provided in a light emitting section thereof, and sealing portions are provided at both ends thereof, a reflection mirror provided so as to be surround the discharge lamp, a base which is fixed to a neck portion of the reflection mirror, an auxiliary start-up light source provided in the base, wherein one of the sealing portions of the discharge lamp is inserted in a through hole formed in the neck portion of the reflection mirror and fixed to the base, wherein a first power supply terminal and a second power supply terminal are provided so as to be apart from each other, wherein a first external electrode and a second external electrode of the auxiliary start-up light source are formed on an outer face of a discharge container thereof so as to be apart from each other, wherein a first lamp power feeder connected to a first external lead extending from the one of the sealing portions of the discharge lamp and a first auxiliary light source power feeder connected to the first external electrode of the auxiliary start-up light source are connected to the first power supply terminal, wherein a second lamp power feeder connected to a second external lead extending from the other sealing portion of the discharge lamp and a second auxiliary light source power feeder connected to a second external electrode of the auxiliary start-up light source are connected to the second power supply terminal.

In the light source apparatus, an opening through which the second lamp power feeder is led out of an inner space to an outer space of the reflection mirror by penetrating therethrough may be formed in the reflection mirror, the base may have a cylindrical reflection mirror support portion having an inner diameter larger than an outer diameter of the neck portion of the reflection mirror, and, in the base, cut-out portions through which the first auxiliary light source power feeder and the second auxiliary power feeder pass, are formed, the first power supply terminal and the second power supply terminal, respectively, may have a fixing section arranged between an inner face of the reflection mirror support portion and an outer face of the neck portion of the reflection mirror, a connecting section extending from the fixing section along an edge face of the reflection mirror support portion in a reflection mirror direction, a return section extending from the connecting section along an outer face of the reflection mirror support portion, and a coupling section extending from the return section in a direction so as to be away from the reflection mirror support portion, and the first lamp power feeder and the first auxiliary light source power feeder may be connected to the first power supply terminal, and the second lamp power feeder and the second auxiliary light source power feeder may be connected to the second power supply terminal.

Thus, in the present light source apparatus, the first lamp power feeder which is connected to the external lead extending from one sealing portion of the discharge lamp, and the first auxiliary light source power feeder which is connected to the first external electrode formed on the exterior surface of the one end side of the electric discharge container of the auxiliary light source, are connected to the first power supply terminal. Moreover, the second lamp power feeder which is connected to the external lead extending from the other sealing portion of the discharge lamp, and the second auxiliary light source power feeder which is connected to the second external electrode formed on the exterior surface of the other end of the electric discharge container of the auxiliary start-up light source, are connected to the second power supply terminal. Since the first electric supply terminal and the second electric supply terminal are provided on the base fixed to the neck portion of the reflection mirror, so as to be apart from each other, when the first electric supply terminal and the second electric supply terminal are fixed to the base, they are not directly fixed to the reflection mirror, so that the reflective surface is not damaged whereby the reflection ratio does not decrease.

Furthermore, since the first electric supply terminal and the second electric supply terminal are fixed to the base fixed to the neck portion of the reflection mirror, the base is located at the most distant place from the casing in which the light source apparatus is provided, so that the first electric supply terminal and the second electric supply terminal have maintained so as to be apart from the casing with a sufficient distance, whereby electric discharge does not occur between the first electric supply terminal and the casing, and between the second electric supply terminal and the casing, so that the light source apparatus may be highly safe.

Furthermore, the base has the cylindrical reflection mirror support section which has an inner diameter larger than an outer diameter of the neck portion of the reflection mirror. Since the cut-out portion is formed in this reflection mirror support section, and the first auxiliary light source power feeder and the second auxiliary light source power feeder of the auxiliary start-up light source are penetrated through this cut-out portion, Wiring of the first and second auxiliary light source power feeders does not become complicated so that it is possible to simplify the power supply path to the auxiliary start-up light source.

Furthermore, since the first electric supply terminal and the second electric supply terminal are fixed between the inner face of the reflection mirror support section of the base, and the exterior face of the neck portion of the reflection mirror, it is possible to simplify the structure for fixing the first and second electric supply terminals to the base.

BRIEF DESCRIPTION OF DRAWINGS

Other features and advantages of the present light source apparatus will be apparent from the ensuing description, taken in conjunction with the accompanying drawings, in which.

DESCRIPTION

The descriptions in the specification are provided for illustrative purposes only, and are not limiting thereto. An appreciation of various aspects of the present light source apparatus is best gained through a discussion of various examples thereof. The meaning of these terms will be apparent to persons skilled in the relevant arts based on the entirety of the teachings provided herein.

Figure 1:
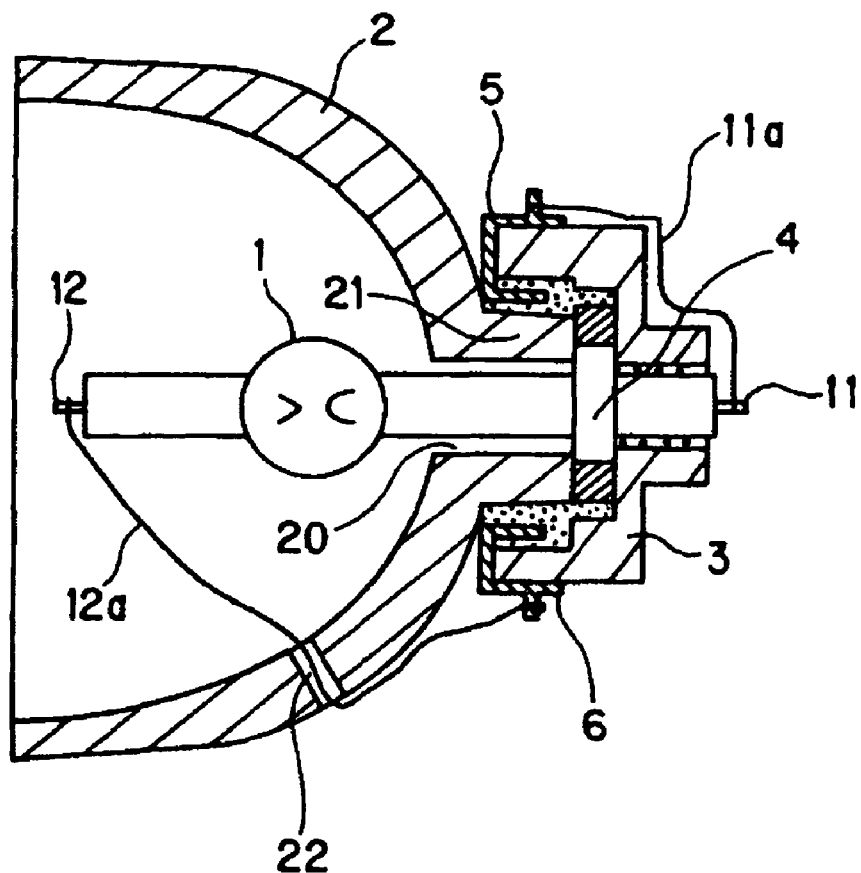
FIG. 1 is a diagram showing the structure of a light source apparatus according to an embodiment.
Figure 2:
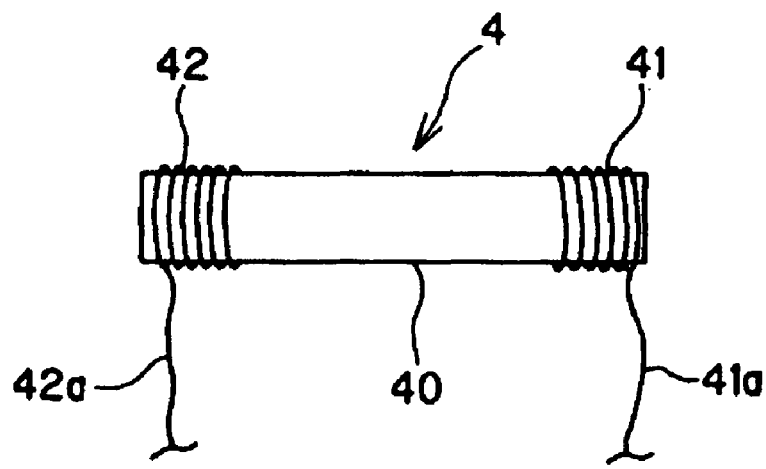
FIG. 2 is a diagram of an auxiliary start-up light source of a light source apparatus shown in FIG. 1.

FIG. 1 is a cross-sectional view of a light source apparatus according to an embodiment, and FIG. 2 is an expanded cross-sectional view of an auxiliary start-up light source shown in FIG. 1.

As shown in FIG. 1, the present light source apparatus, includes an extra-high pressure mercury lamp 1 (hereinafter referred to as a discharge lamp), a reflection mirror 2 which surrounds the discharge lamp 1, a base 3 fixed to a neck portion 21 of the reflection mirror 2, and an auxiliary start-up light source 4 arranged in the base 3. One of sealing portions of the discharge lamp 1 is inserted in a through hole 20 formed in a neck portion 21 of the reflection mirror 2, and is fixed to the base 3 by an adhesive agent. The first electric supply terminal 5 and the second electric supply terminal 6 are fixed to the base 3.

The sealing portions are formed at both ends of an arc tube of the discharge lamp 1, respectively. External leads 11 and 12 which are electrically connected to the electrodes respectively, extend from the respective sealing portions. Inside the arc tube, 0.15 mg/mm$^3$ or more of mercury (for example, 0.2 mg/mm$^3$), is enclosed as a light emitting material. In addition, in order to prevent tungsten, which is the constituent of the electrodes, from adhering to the inner wall of the arc tube due to halogen cycles, halogen gas, such as bromine, whose amount is in a range of $2.0\times10^{-4}$ μmol/mm$^3$ to $7.0\times10^{-3}$ μmol/mm$^3$, for example, $3.0\times10^{-4}$ μmol/mm$^3$, is enclosed. Moreover, 13 kPa of argon gas is enclosed.

In such a discharge lamp 1, the maximum outer diameter of the arc tube is 11.3 mm, the distance between electrodes is 1.2 mm, the inner volume of the arc tube is 116 mm$^3$, the bulb wall load is 1.5 W/mm$^3$, the rated voltage is 80 V and the rated power is 200 W.

As shown in FIG. 2, the auxiliary start-up light source 4 comprises an electric discharge container 40 which is made of quartz glass, first and second external electrodes 41 and 42 which are arranged on the outer surface of the both ends of the electric discharge container 40. Inside the electric discharge container 40, one or more kinds of gas, such as nitrogen or helium, is enclosed, as gas for electric discharge, in addition to the rare gas, such as argon, xenon, and/or neon. Furthermore, in order to acquire the Penning effect, a very small amount of mercury may be enclosed.

The first external electrode 41 and the second external electrode 42 may be formed by winding a wire rod (material) which is made of stainless steel which is excellent in thermal resistance and heat-resistant shock nature, or made of kanthal (iron-chromium alloy), in the longitudinal direction of the electric discharge container 40. In addition, they may be formed by attaching, a wire rod which is beforehand formed in the shape of a coil, to the electric discharge container 40, as the first external electrode 41 and the second external electrode 42.

In the electric discharge container 40, for example, the full length is about 15 mm, the outer diameter is about 3 mm, and the wall thickness is about 0.8 mm. The first external electrode 41 and the second external electrode 42, may be formed by, for example, a wire rod in the shape of coil, whose diameter is 0.3 mm, whose full length (in the longitudinal direction of the electric discharge container 40) is about 4 mm, and whose outer diameter is about 3 mm, and further the distance between the electrodes is about 6 mm. In the electric discharge container 40, for example, approximately $1\times10^2$–$5\times10^5$ pa of argon gas, and $5\times10^5$ mg/mm$^3$ of mercury is enclosed.

Moreover, in the auxiliary start-up light source 4, a first auxiliary light source power feeder 41a is connected to the first external electrode 41, and a second auxiliary light source power feeder 42a is connected to the second external electrode 42, wherein voltage is impressed to the first external electrode 41 and the second external electrode 42, through the first auxiliary light source power feeder 41a and the second auxiliary light source power feeder 42a, at time of starting of the discharge lamp 1, so that the auxiliary start-up light source emits light, whereby ultraviolet rays are emitted therefrom.

Figure 3:
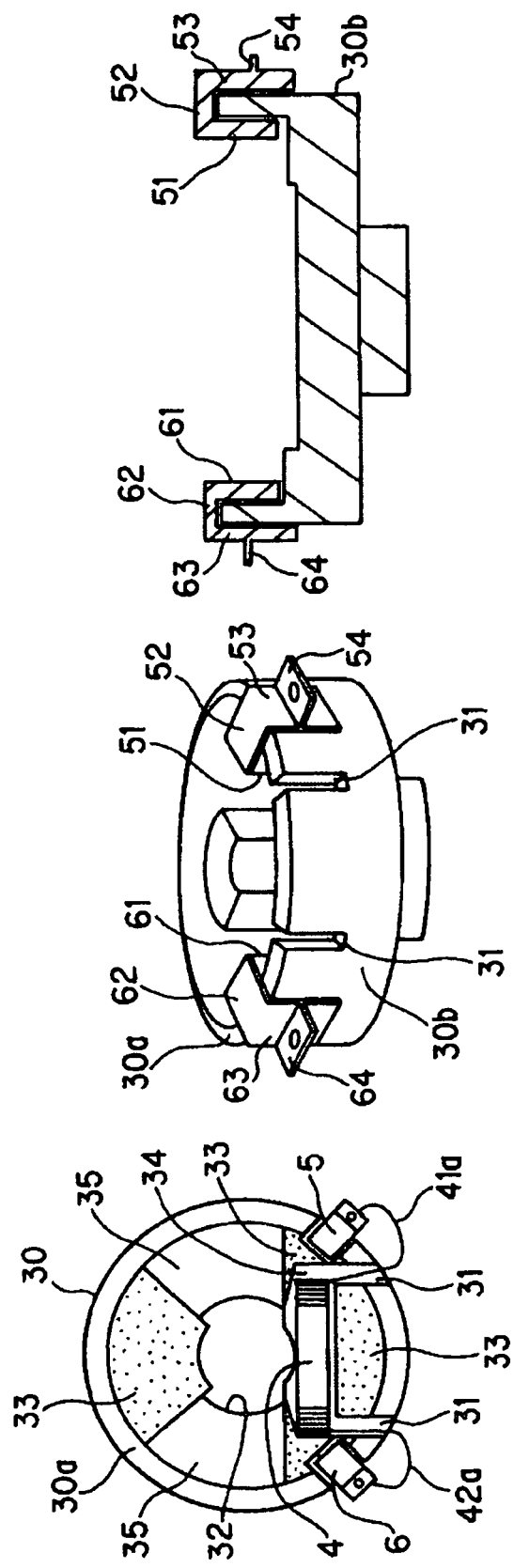
FIG. 3 is a diagram showing the structure of an auxiliary start-up light source, a base, a first electric supply terminal and a second electric supply terminal of a light source apparatus shown in FIG. 1.
Figure 4:
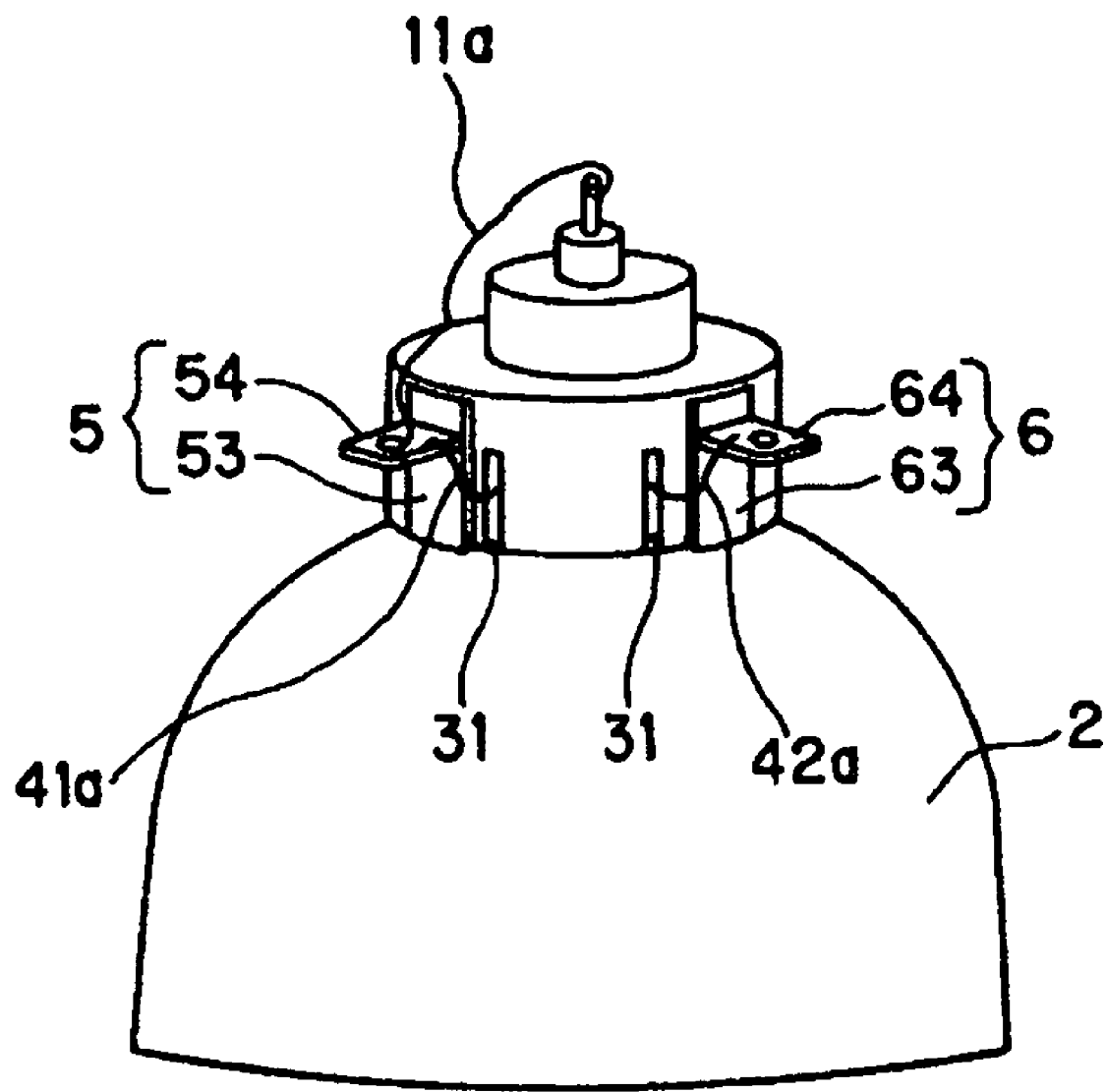
FIG. 4 is a perspective view of a light source apparatus according to an embodiment.

FIGS. 3A, 3B, and 3C are diagrams showing the structure of the auxiliary start-up light source 4, the base 3, the first electric supply terminal 5, and the second electric supply terminal 6. FIG. 4 is a perspective view of the light source apparatus according to the embodiment. Although in FIG. 3A, the auxiliary start-up light source is shown, in FIGS. 3B and 3C, the auxiliary start-up light source is omitted.

In FIGS. 3A, 3B, 3C and 4, the base 3 is made from ceramics. The base 3 has a cylindrical reflection mirror support section 30 which has a larger inner diameter than the outer diameter of the neck portion of the reflection mirror 2. A cut-out portions 31 through which the first auxiliary light source power feeder 41a and the second auxiliary light source power feeder 42a penetrate respectively, are formed in the reflection mirror support section 30. Moreover, the base 3 has a through hole 32 through which one of the sealing portions of the discharge lamp 1 penetrates, contact faces 33 (dotted portions of FIG. 3A) that are brought into contact with an end face of the neck portion 21 of the reflection mirror 2, a concave portion 34 dented to inside thereof from the contact faces 33, and a cooling air circulation section 35 which is dented to the inside thereof from the contact faces and through which cooling air passes. And the auxiliary start-up light source 4 is inserted in the concave portion 34 of the base 3.

The first electric supply terminal 5 and the second electric supply terminal 6, have fixing sections 51 and 61 respectively arranged between the inner face of the reflection mirror support section 30 and the exterior face of the neck portion 21 of the reflection mirror 2, relay sections 52 and 62 which extend from the fixing sections 51 and 61 along with an edge face 30a of the reflection mirror support section 30, which is an end face in the direction of the reflection mirror, turned sections 53 and 63 which extend from the relay sections 52 and 62 along with the outside face 30b of the reflective support section 30, and coupling areas 54 and 64 which extend from the cuff sections 53 and 63 in directions which they extend away from the reflective support section 30.

The first electric supply terminal 5 which is made up of the fixing section 51, the relay section 52, and the section 53, and the second electric supply terminal 6 which is made up of the fixing section 61, the relay section 62, and the section 63, are approximately in shape of a "Π" character in a cross-sectional view thereof, respectively. The first electric supply terminal 5 and the second electric supply terminal 6 are inserted on the front edge of the cylindrical reflection mirror support section 30, so as to be away from each other. Consequently, the first electric supply terminal 5 and the second electric supply terminal 6 can be fixed to the base 3 even though they have a simple structure, respectively.

The first auxiliary light source power feeder 41a and the second auxiliary light source power feeder 42a penetrate through the respective cut-out portions 31 formed in the reflection mirror support section 30 so as to extend to the outside. The first auxiliary light source power feeder 41a is connected to the coupling area 54 of the first electric supply terminal 5, and the second auxiliary light source power feeder 42a is connected to the coupling area 64 of the first electric supply terminal 6. As a result, wiring of the first auxiliary light source power feeder 41a and the second auxiliary light source power feeder 42a does not become complicated, so that it is possible to simplify the electric supply path to the auxiliary start-up light sources.

As shown in FIGS. 1 and 3A, the auxiliary start-up light source 4 is arranged so that the optical axis of the auxiliary start-up light source 4 may be located in a direction approximately parallel to the optical axis of the discharge lamp 1. Consequently, the auxiliary start-up light source 4 can be provided in the base 3. Furthermore, as shown in FIG. 3A, since the first electric supply terminal 5 and the second electric supply terminal 6 are arranged in both side directions of the optical axis of the auxiliary start-up light source 4, the distance between the first electric supply terminal 5 and the second electric supply terminal 6 can be increased.

Referring back to FIG. 1, description will be given below. The first lamp power feeder 11a is connected to the external lead 11 which extends from one of the sealing portions of the discharge lamp 1, and this first lamp power feeder 11a is connected to the coupling area 54 of the first electric supply terminal 5. The second lamp power feeder 12a is connected to the external lead 12 which extends from the other sealing portion of the discharge lamp 1. This first lamp power feeder 12a passes through the opening 22 formed in the reflection mirror 2, and is led from the inside of the reflection mirror 2 to the outside thereof, and further is connected to the coupling area 64 of the second electric supply terminal 6.

Figure 5:
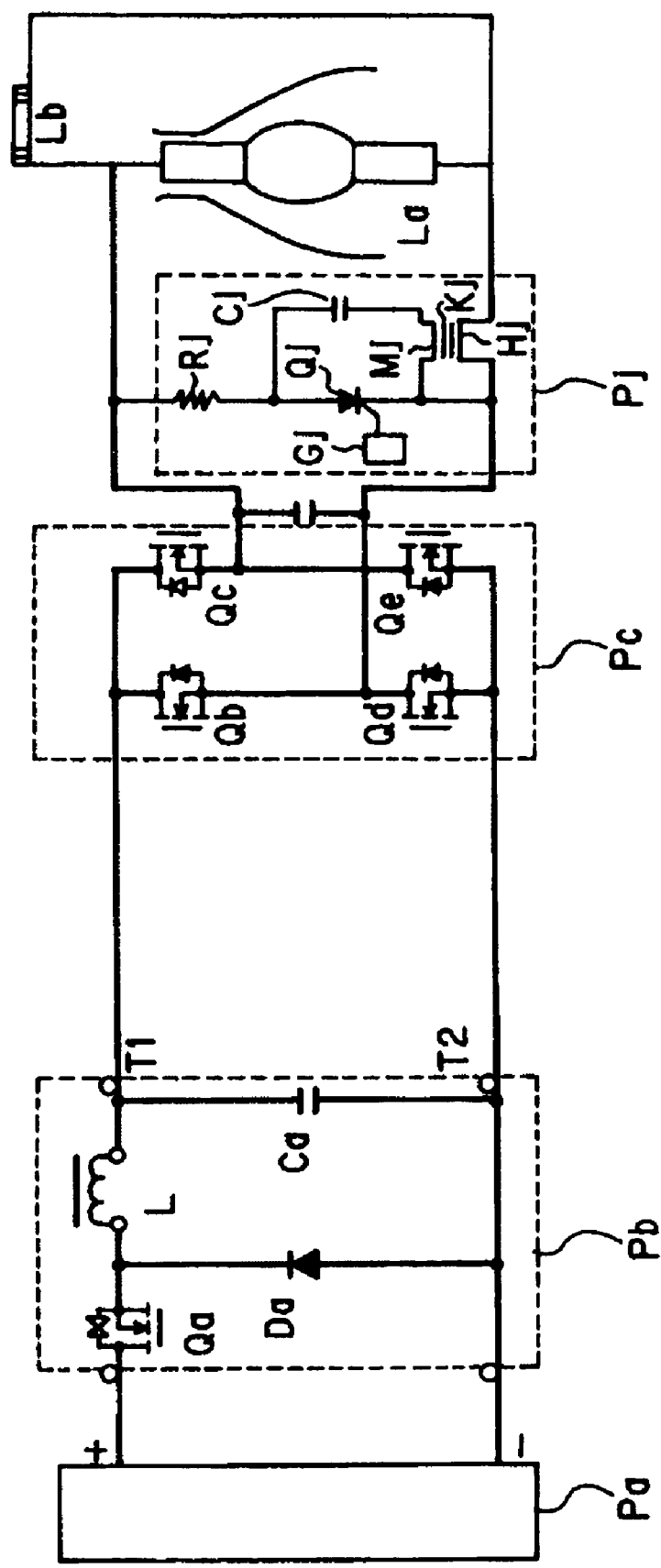
FIG. 5 is a diagram showing a circuit arrangement of a light source apparatus according to an embodiment.
Figure 6:
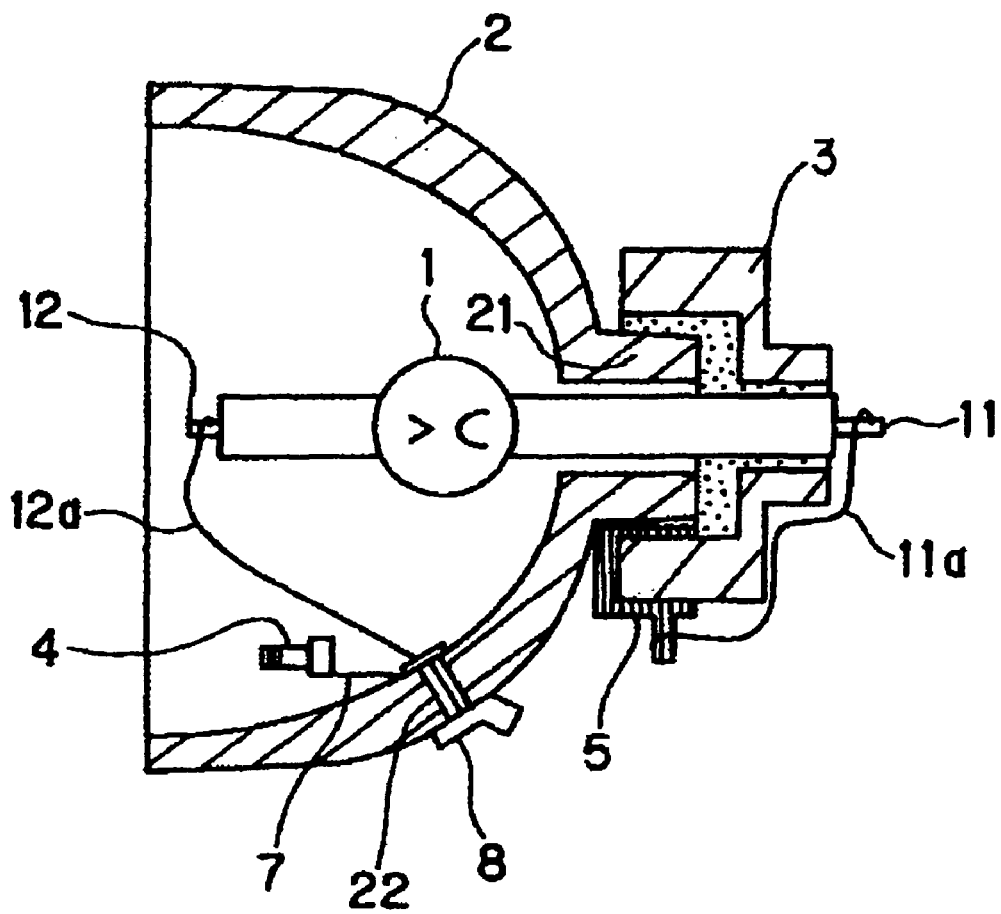
FIG. 6 is a diagram showing the structure of a light source apparatus in the prior art.
Figure 7A:
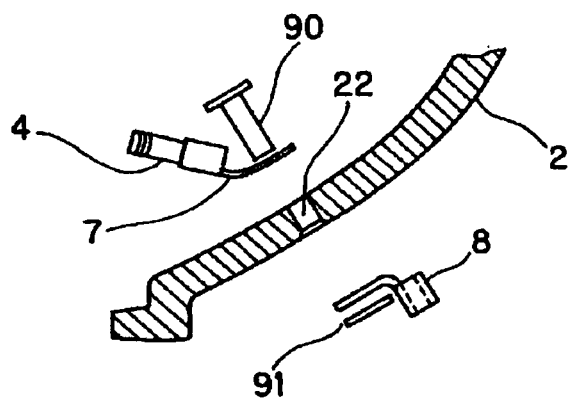
FIG. 7 is a diagram showing a connection structure of an auxiliary start-up light source and a reflection mirror of a light source apparatus shown in FIG. 6.
Figure 7B:
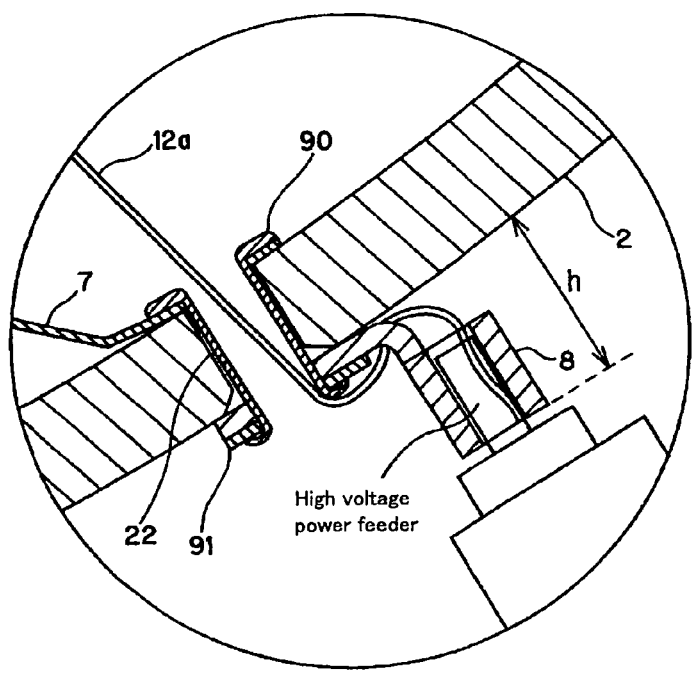

Description of a circuit arrangement of the present light source apparatus will be given below, referring to FIG. 5. FIG. 5 is a schematic view of an example of the circuit for lighting by using a power supply apparatus which is an AC drive system. A DC power source Pa, such as PFC, is connected to a power supply circuit Pb. In this example, a step down chopper system is shown as an example. The current from DC power source Pa is turned on and off by the switching elements Qa, such as an EFT, whereby charging to a smoothing capacitor Ca and current supply to the discharge lamp La is performed, via a choke coil L from DC power source Pa when the switching element Qa is an ON state, and via a diode Da due to induction effect of a choke coil L when the switching element Qa is an OFF state.

A full bridge circuit Pc connected to an output terminals T1 and T2 of the power supply circuit Pb is made up of switching elements, such as FETs, arranged in the shape of a bridge, wherein an alternating current rectangle wave is supplied to the discharge lamp La by switching the switching elements Qb to Qe.

Specifically, a pair of the switching elements Qb and Qe and a pair of the switching elements Qc and Qd are turned ON by turns, so that alternating current is generated with the current which flows in the path of the switching-element Qc→the discharge lamp La→the switching element Qd, and the current which flows in the path of the switching-element Qe→the discharge lamp La→the switching element Qb.

In a trigger circuit Pj, a capacitor Cj is charged through Resistor Rj by the lamp voltage applied between T1-T2. And if a gate driving circuit Gj is driven, when the switching element Qj which consists of a thyristor etc. conducts electricity, a capacitor Cj will discharge through a primary side coil Mj of a transformer Kj, whereby, for example, 5 kV of high-voltage pulse is generated in the secondary side coil Hj. The high voltage generated in the secondary side coil Hj is superimposed on the output voltage of the power supply circuit Pb, and then impressed between the electrodes of the discharge lamp La and between the electrodes of the auxiliary start-up light source Lb. Since the dielectric breakdown voltage of the auxiliary start-up light source Lb is far lower than the discharge lamp La, first, the auxiliary start-up light source Lb is lighted by the 5 kV high-voltage pulse, so that light (ultraviolet rays) is emitted. And the light from the auxiliary start-up light source Lb enters into the light emission section of the discharge lamp La, thereby causing the phenomenon in which the photoelectric effect occurs in the light emission section of the discharge lamp La so that photoelectrons increase. At this time, the 5 kV high-voltage pulse is impressed between the electrodes of the discharge lamp La from the secondary side coil Hj of the transformer Kj so that the discharge lamp La is lighted. Thus, by using light from the auxiliary start-up light source Lb, the breakdown voltage of the discharge lamp La can be decreased, so that even though starting voltage is a low, for example, 5 kV, the discharge lamp La can be turned on.

In addition, although the discharge lamp La and the auxiliary start-up light source Lb are connected in parallel to each other, as shown in FIG. 2, the auxiliary start-up light source Lb has the external electrodes which are winded around both ends of the electric discharge container made of quartz glass and having the electrical discharge space therein. Therefore, while a high voltage pulse is applied thereto at time of starting, in an inner part of the electric discharge container of the auxiliary start-up light source Lb, dielectric polarization occurs, so that electric discharge takes place in the inner space of the electric discharge container. However, when a high voltage pulse is not applied, that is, when the dielectric polarization does not occur in the inner face of the auxiliary start-up light source Lb at time of regular lighting, the auxiliary start-up light source Lb is not lighted. That is, the auxiliary start-up light source Lb is lighted only at the time of starting at which a high voltage pulse is applied thereto.

Moreover, both of the first auxiliary light source power feeder 41a and the second auxiliary light source power feeder 42a of the auxiliary start-up light source are connected with an output terminal of the power supply circuit Pb, so that the potential difference between the first external electrode 41 and the second external electrode 42 of the auxiliary start-up light source can be certainly maintained. Electric field is formed in the electric discharge container 40, by he high voltage pulse applied at the time of starting, and even if the electric field are low, it has the structure in which dielectric breakdown can be caused certainly in the electric discharge container 40 of the auxiliary start-up light source. That is, even if starting voltage is 5 kV which is low voltage, the auxiliary start-up light source can be turn on certainly.

As a result, the starting voltage can be decreased by using the auxiliary start-up light source (Lb). Even if the first electric supply terminal 5 and the second electric supply terminal 6 are moved closer to each other, electric discharge does not occur therebetween. Both the first electric supply terminal 5 and the second electric supply terminal 6 may be provided in the base 3.

Description will be given referring back to FIG. 1. Only the second lamp power feeder 12a penetrates through the opening 22 provided in the reflection mirror 2, and since unlike the prior art, the electric supply terminal is not fixed to the opening 22 using a grommet member, no damage is caused to the dielectric multilayer film for reflecting visible light, which is formed in the inner face of the reflection mirror 2 near the opening 22, so that the reflection ratio of the reflection mirror does not decrease and a high reflection ratio is maintained.

Furthermore, even if a light source apparatus holding space is made small, so that a distance between a back face of the reflection mirror 2 and a casing for defining the holding space of the reflection mirror 2 becomes short, the breakdown voltage of the discharge lamp 1 can be decreased by using light from the auxiliary start-up light source. Furthermore, since the auxiliary start-up light source 4, and the first and second electric supply terminals 5 and 6 which supply electric power to the discharge lamp 1 are fixed to the base which is most distant from the casing, the sufficient distance between the first electric supply terminal 5 and the casing, and the sufficient distance between the second electric supply terminal 6 and the casing can fully be maintained, whereby electric discharge does not occur therebetween, and the high light source apparatus becomes safe and secure.

The preceding description has been presented only to illustrate and describe exemplary embodiments of the present light guiding member and linear light source apparatus. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A light source apparatus, comprising:
  a discharge lamp in which a pair of electrodes are provided in a light emitting section thereof, and sealing portions are provided at both ends thereof;
  a reflection mirror provided so as to be surround the discharge lamp;
  a base which is fixed to a neck portion of the reflection mirror;
  an auxiliary start-up light source provided in the base;
  wherein one of the sealing portions of the discharge lamp is inserted in a through hole formed in the neck portion of the reflection mirror and fixed to the base,
  wherein a first power supply terminal and a second power supply terminal are provided so as to be apart from each other,
  wherein a first external electrode and a second external electrode of the auxiliary start-up light source are formed on an outer face of a discharge container thereof so as to be apart from each other,
  wherein a first lamp power feeder connected to a first external lead extending from the one of the sealing portions of the discharge lamp and a first auxiliary light source power feeder connected to the first external electrode of the auxiliary start-up light source are connected to the first power supply terminal,
  wherein a second lamp power feeder connected to a second external lead extending from the other sealing portion of the discharge lamp and a second auxiliary light source power feeder connected to a second external electrode of the auxiliary start-up light source are connected to the second power supply terminal.

2. The light source apparatus according to claim 1,
  wherein an opening through which the second lamp power feeder is led out of an inner space to an outer space of the reflection mirror by penetrating therethrough is formed in the reflection mirror,
  wherein the base has a cylindrical reflection mirror support portion having an inner diameter larger than an outer diameter of the neck portion of the reflection mirror, and, in the base, cut-out portions through which the first auxiliary light source power feeder and the second auxiliary power feeder pass, are formed,
  wherein the first power supply terminal and the second power supply terminal, respectively, have a fixing section arranged between an inner face of the reflection mirror support portion and an outer face of the neck portion of the reflection mirror, a connecting section extending from the fixing section along an edge face of the reflection mirror support portion in a reflection mirror direction, a return section extending from the connecting section along an outer face of the reflection mirror support portion, and a coupling section extending from the return section in a direction so as to be away from the reflection mirror support portion,
  wherein the first lamp power feeder and the first auxiliary light source power feeder are connected to the first power supply terminal, and the second lamp power feeder and the second auxiliary light source power feeder are connected to the second power supply terminal.

3. The light source apparatus according to claim 1,
  wherein the discharge lamp and the auxiliary start-up lamp are connected in parallel.

* * * * *